(12) United States Patent
Priotti

(10) Patent No.: US 9,331,756 B2
(45) Date of Patent: May 3, 2016

(54) METHOD AND SYSTEM FOR WIRELESS COMMUNICATIONS, CORRESPONDING NETWORK AND COMPUTER PROGRAM PRODUCT

(75) Inventor: Paolo Priotti, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 221 days.

(21) Appl. No.: 13/642,290

(22) PCT Filed: Apr. 20, 2010

(86) PCT No.: PCT/EP2010/002401
§ 371 (c)(1),
(2), (4) Date: Oct. 19, 2012

(87) PCT Pub. No.: WO2011/131210
PCT Pub. Date: Oct. 27, 2011

(65) Prior Publication Data
US 2013/0034040 A1 Feb. 7, 2013

(51) Int. Cl.
H04B 7/04 (2006.01)
H04B 7/06 (2006.01)
H04W 72/04 (2009.01)

(52) U.S. Cl.
CPC ............ H04B 7/0452 (2013.01); H04B 7/0417 (2013.01); H04B 7/066 (2013.01);
(Continued)

(58) Field of Classification Search
USPC ......... 370/312, 328–334, 343–344, 347–348, 370/436
See application file for complete search history.

(56) References Cited

U.S. PATENT DOCUMENTS

2002/0089451 A1* 7/2002 Wang et al. ................. 342/458
2003/0078050 A1* 4/2003 Carlborg et al. ............. 455/452
(Continued)

FOREIGN PATENT DOCUMENTS

EP 1 578 043 A1 9/2005
EP 1 821 444 A2 8/2007
(Continued)

OTHER PUBLICATIONS

Office Action issued Mar. 6, 2014 in Japanese Patent Application No. 2013-505336 (submitting English translation only).
(Continued)

*Primary Examiner* — Michael Thier
*Assistant Examiner* — Eric Myers
(74) *Attorney, Agent, or Firm* — Oblon, McClelland, Maier & Neustadt, L.L.P.

(57) ABSTRACT

A multiple-user multiple input-multiple output wireless communication system uses a set of multiple subcarriers arranged in plural subsets or resource blocks. Precoding of signals transmitted from a base station to user terminals involves acquiring channel state information on the connection channel between the base station and user terminals in the plurality. Channel quality indicators are detected with user terminals for respective subsets of resource blocks to produce user/resource block pairs having associated channel quality indicators. The user/resource block pairs are subjected to selection as a function of the channel quality indicators associated therewith so that precoding is performed by acquiring channel state information exclusively for the user/resource block pairs surviving the selection as a function of the channel quality indicators and, possibly, other selection steps as a function of other parameters, such as, speed, maximum bit rate, and direction of arrival or angular spread in a multiple-stage selection process.

16 Claims, 2 Drawing Sheets

Figure 1:
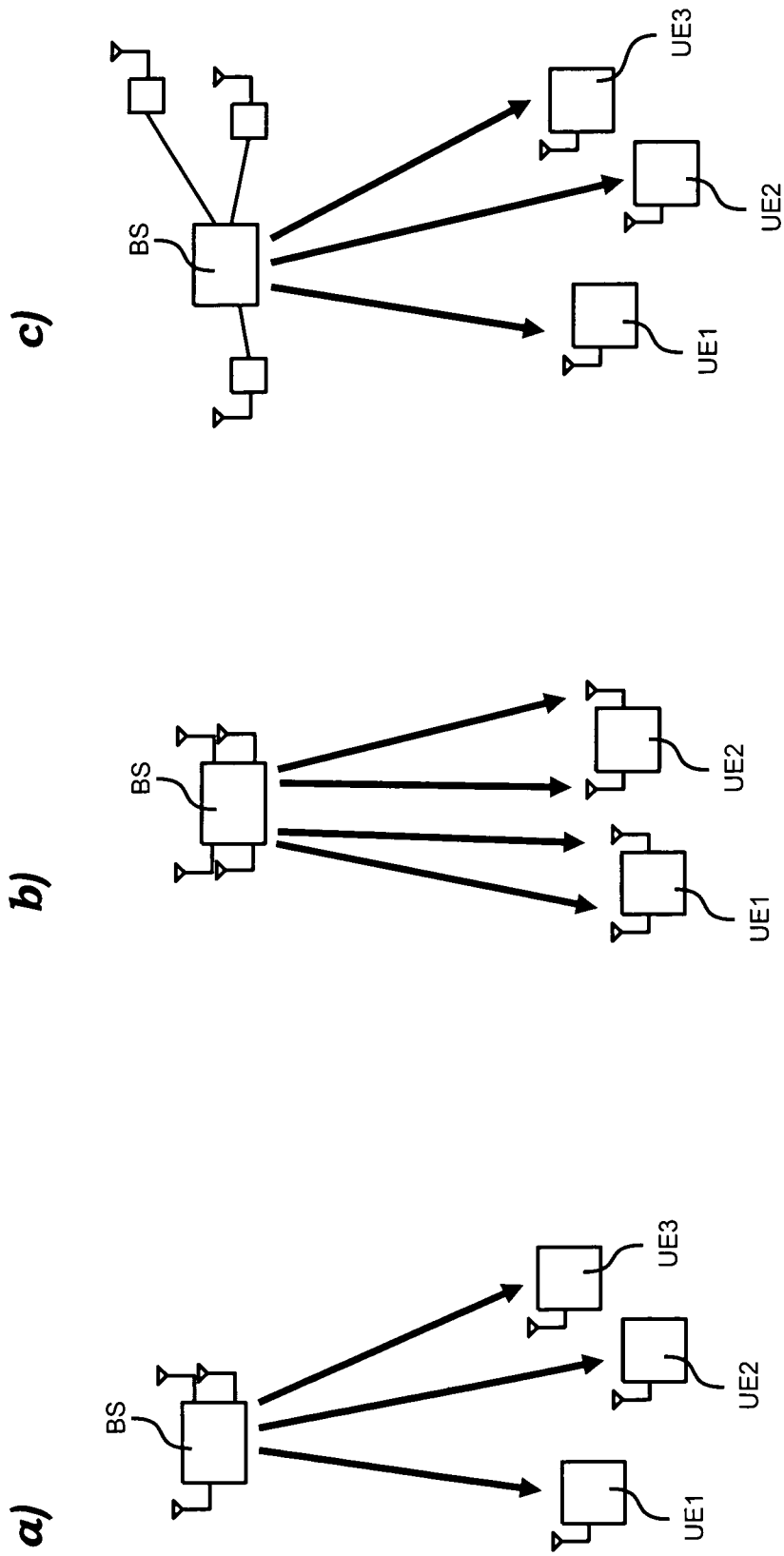

(52) U.S. Cl.
CPC .......... *H04B 7/0617* (2013.01); *H04B 7/0626* (2013.01); *H04B 7/0632* (2013.01); *H04W 72/04* (2013.01); *H04W 72/0406* (2013.01); *H04W 72/048* (2013.01); *H04W 72/0413* (2013.01)

(56) References Cited

U.S. PATENT DOCUMENTS

| | | | |
|---|---|---|---|
| 2007/0211823 | A1 | 9/2007 | Mazzarese et al. |
| 2008/0117815 | A1 | 5/2008 | Kim et al. |
| 2008/0232502 | A1* | 9/2008 | Wild et al. .................. 375/267 |
| 2008/0242309 | A1 | 10/2008 | Borst et al. |
| 2008/0311939 | A1 | 12/2008 | Hugl et al. |
| 2009/0046647 | A1 | 2/2009 | Roh et al. |
| 2009/0052405 | A1 | 2/2009 | Ko et al. |
| 2010/0041406 | A1 | 2/2010 | Kim et al. |
| 2010/0151871 | A1 | 6/2010 | Zhang et al. |
| 2012/0002568 | A1* | 1/2012 | Tiirola et al. ................. 370/252 |

FOREIGN PATENT DOCUMENTS

| | | |
|---|---|---|
| EP | 2 056 506 A1 | 5/2009 |
| EP | 2 101 420 A2 | 9/2009 |
| JP | 2004-208234 A | 7/2004 |
| JP | 2008-79262 A | 4/2008 |
| JP | 2009-33744 A | 2/2009 |
| JP | 2009-219054 A | 9/2009 |
| WO | WO 2007/109630 A1 | 9/2007 |
| WO | WO 2008/118067 A2 | 10/2008 |
| WO | WO 2009/022811 A1 | 2/2009 |
| WO | WO 2009/026768 A1 | 3/2009 |
| WO | WO 2009/038509 A1 | 3/2009 |

OTHER PUBLICATIONS

Stankovic et al.; "Generalized Design of Multi-User MIMO Precoding Matrices", IEEE transactions on Wireless Communications, vol. 7, No. 3, pp. 953-961, (2008).

Caire et al.; "On the Achievable Throughput of a Multiantenna Gaussian Broadcast Channel", IEEE Transactions on Information Theory, vol. 49, No. 7, pp. 1691-1706, (2003).

Nokia Siemens Networks, Nokia; "CoMP Performance Evaluation", 3GPP TSG-RAn WG1 Meeting #60, R1-101431, 7 pages, (2010).

"3$^{rd}$ Generation Partnership Project; Technical Specification Group Radio Access Network; Evolved Universal Terrestrial Radio Access (E-UTRA); Physical Layer Procedures, (Release 9)", 3GPP TS 36.213 V9.1.0, pp. 1-83, (2010).

International Search Report from the European Patent Office for International Application No. PCT/EP2010/002401, mailing date May 12, 2011.

Office Action issued Feb. 9, 2015 in Chinese Patent Application No. 201080066295.2, along with its English translation.

* cited by examiner

METHOD AND SYSTEM FOR WIRELESS COMMUNICATIONS, CORRESPONDING NETWORK AND COMPUTER PROGRAM PRODUCT

CROSS REFERENCE TO RELATED APPLICATION

This application is a national phase application based on PCT/EP2010/002401, filed Apr. 20, 2010, the content of which is incorporated herein by reference.

FIELD OF THE INVENTION

This disclosure relates to wireless (e.g. radio) communications.

This disclosure was devised by paying attention to its possible use in transmission systems employing a so-called Multi-User Multiple Input-Multiple Output (MU-MIMO) technique.

DESCRIPTION OF THE RELATED ART

The MU-MIMO technique is a multi-user transmission technique which can be adopted in multi-carrier radio communication systems like OFDM, where the bandwith of the communication channel is divided in a plurality of sub-bands called subcarriers. In cellular systems like 3GPP LTE-A (3rd Generation Partnership Project Long Term Evolution-Advanced), subcarriers are arranged in plural sub-sets (called Physical Resource Blocks—PRBs, or, briefly, RBs) of the set of subcarriers. In MU-MIMO systems, a given frequency resource is re-used multiple times at a given instant for transmitting multiple streams of information pertaining to different users. Multiple streams are separated thanks to the different spatial propagation paths seen by signals transmitted and received by spatially separated antennas.

In the downlink (DL) transmission direction—that is from a base station towards the user equipments—an MU-MIMO system operates such that multiple transmit antennas belonging to the base station (or Node B) are used to transmit on the same frequency resources to multiple users.

FIG. 1 of the annexed representations is schematically representative of various possible topologies of MU-MIMO DL connection. In all representations, BS denotes a base station (Node B), while user equipments (UEs) are denoted UE1, UE2, UE3, . . . .

Specifically, part a) of FIG. 1 shows co-located BS transmitters and single stream per user.

Part b) shows co-located BS transmitters and single or multiple stream per user.

Part c) shows distributed coordinated BS transmitters and a single stream per user.

In all of the above configurations, each user receives a mixture of the signals intended for all the users, such experiencing interference. Interference can be largely limited by precoding operated at the transmitter.

In contrast to Single-User MIMO (SU-MIMO) systems, in a MU-MIMO system DL receive antennas do not belong all to the same terminal. This fact makes a difference in the way reception is achieved: in SU-MIMO all spatial streams are adapted to be decoded jointly (or sequentially), improving transmission performance. For that reason, operating MU-MIMO precoding at the base station may be important in MU-MIMO systems. MU-MIMO precoding usually has the purpose to alleviate interference between the streams directed to different users.

MU-MIMO precoding can be classified according to a number of characteristics, such as:

the type of operations performed at the transmitter, e.g. linear or non-linear. Articles such "Generalized Design of Multi-User MIMO Precoding Matrices" by Veljko Stankovic and Martin Haardt, IEEE 2008 and "On the Achievable Throughput of a Multiantenna Gaussian Broadcast Channel" by Giuseppe Caire, and Shlomo Shamai, IEEE 2003 provide basic reference information on linear and non-linear precoding, respectively;

the type of channel state information (CSI) available at the transmitter, e.g. be short-term or long-term. Short term precoding takes into account fast fading, while long-term precoding takes into account only relatively slow variations in the channel;

the spatial correlation of transmit antennas: precoding can be implemented as a beamforming technique or as a classical MIMO transmission. Beamforming may be performed with half-wavelength, strongly correlated transmit antenna arrays, and is more often implemented as a long-term technique. A precoding operating like a classical MIMO transmission usually happens with far spaced, largely uncorrelated transmit antennas, and is based on short-term channel state information.

While the focus of this disclosure is not on the type of precoding adopted and its characteristics, for the purposes herein it will be sufficient to recall that a MU-MIMO system may include a base station having $M_T$ transmit antennas and serving K users. For simplicity one may assume that each user is equipped with a constant number of $M_R$ receive antennas each, with $M_R \leq M_T/2$. One may similarly assume that the base station divides the frequency resources into $\Psi$ blocks (Resource Blocks, RBs), with e.g. $\Psi < K$, and that each served user which is actually scheduled utilizes exactly one RB.

Optimal precoding would require that all possible user groupings are considered for each RB, that precoding is actually computed for each possible grouping, and that, finally, a selection of groups maximizing a given objective function to be chosen for scheduling. In other words, for each RB, a total of $$\binom{K}{\lceil M_T/M_R \rceil}$$

possible precoding schemes have to be computed.

Since channel state information is supposed different for each RB, any type of precoding that is dependent on the channel state (which usually is true) will lead to a total of $$\Psi\binom{K}{\lceil M_T/M_R \rceil}$$

precoding schemes to be computed. This can easily lead to impractical figures (e.g. $M_T=4$, $K=60$, $M_R=2$, $\Psi=50$ gives a total of $$\Psi\binom{K}{\lceil M_T/M_R \rceil} = 88,500),$$

especially when sophisticated and computationally heavy precoding needs to be computed in real-time.

Concerning channel knowledge at the transmit side, one may consider first a frequency division duplexing (FDD) system, where DL channel estimation is carried out via pilot signals with a density of $\xi$ pilots per RB. Channel knowledge at the transmitter may be assumed to mean that those pilots need to be sent in the uplink (UL) direction. Then for each time interval a total of $M_R \cdot M_T \cdot \Psi \cdot K \cdot \xi$ complex numbers would need to be transmitted. With the same numbers of the example considered above, and for $\xi=2$, time interval of 1 ms, and 16 bits needed to quantize a single complex number, a total of 768 Mbit/s would be required in UL signalling, which is likely much more than the total UL capacity itself.

In a time division duplexing (TDD) system DL and UL reciprocity can help in acquiring information on the channel, provided that a proper compensation or tuning of RF parts is present. However, the knowledge of the channel seen by all users requires that all users transmit in the UL over the whole bandwidth and with all of their transmit antennas. This might be difficult to achieve in practice, especially for a high number of users.

These issues have been tackled to some extent in the patent literature.

For instance, US-A-2008/0117815 discloses a method to reduce feedback quantity and scheduling complexity, while WO-A-2009/38509 discloses an arrangement to adapt the modulation chosen for each user between SU-MIMO modes and MU-MIMO modes based on user velocity, which is a useful parameter.

A somewhat similar disclosure is provided in WO-A-2007/109630.

Document US-A-2008/0242309 addresses the issue of reducing signalling in the UL channel by selecting user terminals based on the magnitude of their channel only.

OBJECT AND SUMMARY OF THE INVENTION

The inventor has thus noted that conventional precoding schemes (especially of the short-term type) for MU-MIMO systems based on an estimate of the connection channel between the base station and user equipments present two types of challenges: they require full channel knowledge for every user at the transmitter and imply a computationally heavy scheduling phase.

The inventor has similarly noted that various reasons prevent these issues from being solved by the prior art patent documents considered in the foregoing.

A first reason may be excessive latency, e.g. because users are selected sequentially with a very complex process of sending several times a so-called partial information feedback. Excessive latency could limit the minimum acceptable channel coherence time. A related problem may lie in the fact that, because partial information feedback is sent several times in the uplink (UL) direction, so that the total amount of feedback information may turn out be too large.

Another reason may lie in the difficulty in limiting to reasonable amounts the feedback quantity in the uplink direction: if e.g. a high number of users exhibit low mobility, many candidates for MU-MIMO will be present, and so both signalling load in the UL and computation complexity for scheduling at the base station will be excessive.

Still another reason is the impact on scheduling complexity, e.g. because (irrespective of the type of feedback possibly adopted) UL signalling of the magnitude of all channels becomes very heavy, which make a realistic implementation of a MU-MIMO precoder very critical.

The object of the invention is thus to provide a solution exempt from the drawbacks highlighted in the foregoing.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

Various embodiments relate to precoding signals transmitted from a base station to a plurality of user terminals in a MU-MIMO wireless communication system using a set of multiple subcarriers arranged in plural subsets (e.g. RBs) of said set of multiple subcarriers, wherein said precoding involves acquiring channel state information (e.g. CSI) on the connection channel between the base station and user terminals in said plurality.

Various embodiments thus provide for detecting with the user terminals of said plurality channel quality indicators (e.g. CQIs or explicit SINR estimates) for respective subsets of said set of multiple subcarriers, by associating to each channel quality indicator a respective subset of said set of multiple subcarriers for which the channel quality indicator has been detected; user/subset pairs are thus created having associated channel quality indicators, and these user/subset pairs are subjected to selection as a function of the channel quality indicators associated therewith so that precoding is performed by acquiring channel state information (exclusively) for the user/subset pairs resulting from said selection as a function of the channel quality indicators (and, possibly, other selection steps as a function of other parameters such as speed, maximum bit rate, direction of arrival or angular spread in a multiple-stage selection process).

Various embodiments overcome the drawbacks inherent in prior art solutions (e.g. the need for full channel knowledge for every user at the transmitter and/or a computationally heavy scheduling phase) by utilizing quantities that are otherwise already available as UL feedback to select the candidate users for MU-MIMO.

Various embodiments relate to implementations of MU-MIMO precoding that are not specifically related to the type of precoding adopted. Various embodiments can be applied to both linear and non-linear MU-MIMO precoding schemes, while certain embodiments are particularly suited to short-term precoding. In various embodiments, user selection is RB-specific. In various embodiments, selection is multi-stage to limit inasmuch as possible the quantity of UL feedback.

In various embodiments, user selection is based on a reported indicator of channel quality such as eg. indicator known as CQI (Channel Quality Indicator).

In various embodiments, e.g. in case of wide-band CQI reporting, the user is considered a candidate for MU-MIMO on all available RBs only if the CQI exceeds a given threshold.

In various embodiments, in case of RB-specific CQI reporting, the selection is operated on per-RB basis: if the CQI is signalled only for the best RBs ("best-M" mode), then a terminal is not considered a candidate for MU-MIMO for those RBs without a signalled CQI, and for those RBs with a CQI a threshold may be applied.

In various embodiments, the indicator of channel quality may be represented by an explicit SINR estimate, which is signalled in the UL in the place of the CQI, and is processed in a similar way to a CQI.

In various embodiments, those users requesting the maximum available per-user bit rate (e.g. requiring a high bit-rate service in a network with small load, or privileged "premium" users) are to be excluded from MU-MIMO (especially when operated with co-located antennas).

In various embodiments, user selection may involve estimated user motion speed: for instance, MU-MIMO may be ruled out for users having an estimated speed exceeding a pre-determined speed threshold.

In various embodiments, speed may be estimated at the base station based on the UL signal; it may also be estimated at the mobile terminal based on DL signal or an independent positioning system. In this latter case, the estimated speed is reported to the base station.

In various embodiments, the feedback quantity can be reduced by using a single bit indicated if the speed is below or above the threshold.

In various embodiments, where an estimated direction of arrival and angular spread is available at the base station, the selection of users may operate so that, for each RB, the candidates will not have similar directions of arrival and angular spread.

In various embodiments, if the candidates are concentrated along given directions, only a small number of users inside a given angular spread is considered as candidates for MU-MIMO (some users may be excluded operating on a random basis inside the given angular spread).

In various embodiments, the base station will then signal in the DL a request to the candidate user terminals to transmit their full Channel State Information (CSI) on the UL; the request will typically be limited to a few RBs per user terminal.

In various embodiments wherein selection is based on best-M CQI signalling, it could be implied that if the base station requests the full CSI, then it is relative to all or the best M' resources, where M'<M, such saving DL signalling resources.

In various embodiments, after the candidate users have signalled their full CSI on the uplink, a scheduling phase is provided where only candidate users will be considered for MU-MIMO scheduling; for scheduled users MU-MIMO precoded signal is then computed based on the full CSI information.

Various embodiments apply to wireless systems using MU-MIMO transmission, and in particular those types of MU-MIMO featuring a precoding at the transmit side which needs a detailed channel state knowledge.

BRIEF DESCRIPTION OF THE ANNEXED REPRESENTATIONS

Figure 2:
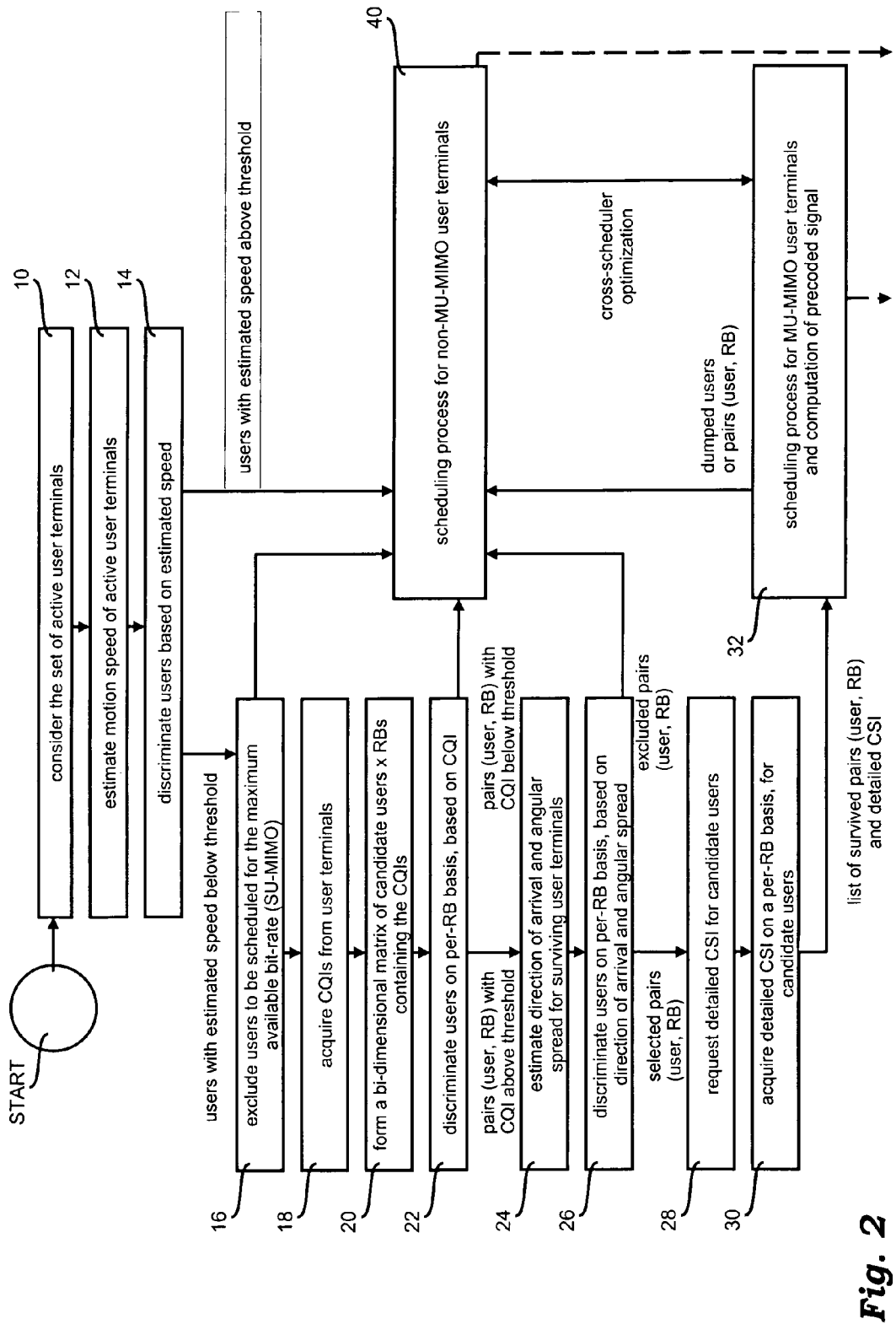

The invention will now be described, by way of example only, with reference to the enclosed figures of drawing, wherein:

FIG. 1 has been already described in the foregoing;

FIG. 2 is flowchart representative of operation of various embodiments.

DETAILED DESCRIPTION OF EMBODIMENTS

In the following description, numerous specific details are given to provide a thorough understanding of embodiments.

The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

This disclosure will refer to various exemplary embodiments applied to downlink (DL) connections in a system otherwise conforming to the 3GPP standard Release 10 and beyond (LTE-A, Long Term Evolution-Advanced). Various embodiments are applicable to other cellular and non-cellular wireless systems based multi-carrier transmission techniques (like OFDM), or on single carrier transmission. In the case of single-carrier based systems, the full bandwidth will be allocated to a group of MU-MIMO users at a time, but the concept of pre-selection remains applicable.

The flowchart of FIG. 2 is representative of an exemplary embodiment of a procedure for selection of user terminals to be considered for precoding purposes within a transmitter using MU-MIMO. It will otherwise be appreciated that certain steps of the exemplary procedure of FIG. 2 may be omitted or their order may be altered.

After a START step, the "intelligence" of the system (for the sake of simplicity this will be assumed to be located at the base station BS e.g. Node B, while a distributed arrangement is also possible) will start by considering the set $\Omega=\{\omega_i\}$ of all active users, step 10.

As used herein, the term active user terminal will indicate those user terminals that have pending requests for DL transmission, that is those user terminals having their radio interface in the connected state, and waiting to be scheduled for DL transmission.

Assuming that K is the number of active users so that $\Omega=\{\omega_i\}$, i=1 . . . K, one may similarly assume that, in a step 12, the base station will be able to estimate for the i-th user the motion speed $v_i$ of the user itself, or the speed of the fastest scatters in the propagation channel (or the UL receiver in the case of a moving base station). Speed estimation techniques of the type considered herein are known in the art, which makes it unnecessary to provide a detailed description herein.

If $v_{max}$ denotes the maximum motion speed tolerable for MU-MIMO scheduling, a new set of users can be defines as:

$$\Omega_1 = \{\omega_i\},$$
$$\begin{cases} \omega_i \in \Omega \\ v_i \leq v_{max}. \end{cases}$$

This first selection step (generally designated step 14 in FIG. 2) will lead to partitioning the active users in two sets, namely:

users with estimated speed below (and equal to) the threshold $v_{max}$;

users with estimated speed above the threshold $v_{max}$.

This selection step may be further refined into substeps when different orders of MU-MIMO are present in the system.

By means of example, if 2×2 and 4×4 types of MU-MIMO are present, where the number of receive antennas per user are $M_R=1$ in both cases, one may assume then that 2×2 will operate at somewhat higher speeds than 4×4. In that case, two maximum acceptable speeds $v_{max}$ will be present, namely a higher one ($v_{max2\times2}$) for 2×2 and a lower one ($v_{max4\times4}$) for 4×4.

Users will then be divided in users that are not eligible for any type of MU-MIMO scheduling, users eligible for 2×2 only, and users eligible for both types of MU-MIMO scheduling.

In any case, users not held to be eligible for any type of MU-MIMO scheduling (e.g. users with estimated speed above the threshold $v_{max}$) will be forwarded to a scheduling process 40 (of a known type) for non-MU-MIMO user terminals.

In a step 16, the system will also exclude those users that are candidates for a connection with maximum bit-rate (for example premium users willing to pay a higher fare). As a result of the step 16, a new selected set of user will thus be formed:

$$\Omega_2 = \{\omega_i\},$$
$$\begin{cases} \omega_i \in \Omega_1 \\ \omega_i \notin \Lambda \end{cases}$$

where $\Lambda$ is the set of users chosen as candidates for a maximum bit-rate connection by the scheduling policy. Again, these users, which may be better served with SU-MIMO allocation, are forwarded to the scheduling process 40 for non-MU-MIMO user terminals.

In a step 18, the system will then acquire channel quality indicators (the CQI parameter) for the elements included in $\Omega_2$.

In a step 20, the CQI values thus collected will be arranged in a bi-dimensional matrix $\Sigma$, where each row corresponds to a user terminal $\omega_i \in \Omega_2$, and each column corresponds to a RB (i.e. one of the subsets of the set of multiple sub carriers used in the system).

In various embodiments, the base station will then fill-in the elements $\sigma_{ij}$ of the matrix with the values of the CQIs, where available, as follows.

When the CQI is not available for a user terminal, all the RBs for that user terminal will be marked as not suitable for MU-MIMO (this can be set in practice to the lowest possible CQI value).

For wide-band types of CQI, there are two choices:
  if that type of CQI is not held to be adapted for MU-MIMO, all the RBs for that user terminal will be marked as not suitable for MU-MIMO;
  otherwise, all the RBs for that user terminal will be marked with the same value of CQI.

For "best-M" type of CQI, the corresponding RBs will be marked with the corresponding value of the CQI, while other ones will be marked as not suitable for MU-MIMO.

Further on, in a step 22, the pairs $(\omega_i, RB_j)$, $\omega_i \in \Omega_2$, will be selected as suitable for MU-MIMO scheduling only if the corresponding CQI value in $\Sigma$ is above a given threshold value $\lambda$. As such, we define a new set of selected pairs (user, RB) as follows:

$$\Omega_3 = \{(\omega_i, RB_j)\},$$
$$\begin{cases} \omega_i \in \Omega_2 \\ \sigma_{ij} \geq \lambda. \end{cases}$$

The value of $\lambda$ does not need to be static, but can be dynamically adapted in time, to optimize different load situations.

In the step 22, the users corresponding to those (user, RB) pairs that exhibit a CQI below the threshold value $\lambda$ or to those (user, RB) pairs for which no CQI is available (and are thus set to a lowest possible CQI value—lower than $\lambda$) are forwarded to the scheduling process 40 for non-MU-MIMO user terminals being thus discarded for the purposes of MU-MIMO precoding.

A next, optional, selection phase assumes that the base station BS is capable of estimating the Direction of Arrival (DoA) of the waves transmitted by a given user terminal. Optionally, Angular Spread (AS) may (also) be estimated.

The above quantities can be estimated in a step 24 e.g. by resorting to algorithms available in the literature (e.g. MUSIC and ESPRIT algorithms), and a successful estimate is easier when antennas at the base station are spatially correlated.

In various embodiments, users having similar DoA should not be scheduled on the same RBs, especially when they have similar ASs.

An exemplary algorithm using the DoA may be written in pseudo-code as follows:

```
initialize Ω_4 = Ω_3
for j = 1 to number of RBs
    store U = set of users selected for MU-MIMO on RB (j)
    set to zero a list of users for each direction of
arrival (with a given angular step)
        while ( U not empty )
            pick up the user (i) in U with highest CQI value
on RB (j)
            store DoA = direction of arrival for user (i)
            if ( list of users for DoA has less than maximum
number of users )
                add to the list for DoA user (i)
            end if
            delete user (i) from set U
        end while
        store U = set of users selected for MU-MIMO on RB (j)
        for k = 1 to number of elements in U
            pick up the k-th element of U, which is user (i)
            if ( user (i) is member of any list of users for
all the DoAs )
                do nothing
            else
                remove the pair (ω_i, RB_j) from Ω_4
            end if
        end for
end for
```

As a result of the above algorithm (or an equivalent procedure) being implemented in a step 26, excluded (user, RB) pairs are forwarded to the scheduling process 40.

Conversely, the selected (user, RB) pairs constitute a final set of candidate pairs $(\omega_i, RB_j)$ in $\Omega_4$ ready to be used for DL signalling.

To that effect, in a step 28 the base station BS will request the detailed CSI for the pairs $(\omega_i, RB_j)$ in $\Omega_4$, or a subset thereof, when the number of elements in $\Omega_4$ exceeds a predetermined threshold.

In a step 30, the candidate users $\{\omega_i\}$, $\exists (\omega_i, RB_j) \in \Omega_4$ or a subset thereof will then transmit via UL signalling the detailed CSI to the base station.

In various embodiments, DL signalling to request the detailed CSI and the associated UL signalling for the transmission of the CSI may be designed in various ways.

In various embodiments the base station will send on the DL information corresponding to the unique identifiers of the ordered elements $(\omega_i, RB_j)$ for each element in $\Omega_4$ (or a subset). It will be appreciated that signalling may take place in various ways, including the transmission of the identifier of the/each selected terminal followed by the list of its related resource blocks, which could also be limited or fixed in number to limit complexity; the downlink signalling will trigger the uplink transmission of the requested CSI.

In various embodiments, wherein selection may be based on a best-M CQI signalling strategy, with the DL signalling corresponding to step 28 operating as follows. The base station transmits in the DL just the identifiers $\{\omega_i\}$ of the user terminals $\{\omega_i\}$, $\exists (\omega_i, RB_j) \in \Omega_4$, or a subset thereof. This could also correspond to a single bit per user terminal within a signalling word, where the bit is set or reset to enable or disable detailed CSI feedback. The user terminal identifier could also be transmitted together with a user-terminal specific resource block count indicating how many resource blocks are considered candidates after the selection for that user terminal. In this case every user terminal would transmit in the UL the detailed CSI corresponding to the all or a subset of the resource blocks it has previously signalled the CQI value for.

In the following, one exemplary practical design for the feedback is considered, by assuming that selection is based on best-M CQI signalling with M=4. The base station during step 28 transmits two bits $(b_{1i}, b_{2i})$ for every active user terminal, where:

$$\begin{cases} b_{1i} = 1 & \Leftrightarrow \{\omega_i\}, \exists (\omega_i, RB_j) \in \Omega_4 \\ b_{1i} = 0 & \text{otherwise} \end{cases}$$

$$\begin{cases} b_{2i} = 1 & \Rightarrow \theta_i = 1 \\ b_{2i} = 0 & \Rightarrow \theta_i = 2 \end{cases}$$

Then each user terminal $\omega_i$ will implement the UL signalling step 30 by transmitting the CSI for the $\theta_i$ resource blocks that it associates with the best CSI values.

Once reconstructed the detailed CSI for the candidate pairs $(\omega_i, RB_j)$, i.e. the "surviving" pairs resulting from the selection, in a step 32, the base station will proceed with scheduling and computation of the final MU-MIMO precoded signal for DL transmission.

As indicated, this may occur by resorting to a known precoding technique/arrangement, possibly involving mutual co-operation of the scheduling processes 32 and 40.

For instance, the scheduling process 32 may "dump" certain users (or pairs) towards the process 40. Co-operation of the scheduling processes 32 and 40 may involve cross-scheduler optimization.

As indicated, the order of certain steps in the exemplary procedure of FIG. 2 may be optionally changed.

For instance, by altering the order of the pre-selection steps we can imagine the following embodiments:
(speed—step 14)->(max bit rate—step 16)->(DoA and AS—step 26)->(per-RB CQI—step 22)
(max bit rate—step 16)->(speed—step 14)->(per-RB CQI—step 22)->(DoA and AS—step 26)
leading to several possible combinations.

In various embodiments, the pre-selection step 22 based on per-RB CQI is always present, while the other selection steps 14, 16 and 26 are optional.

Consequently, without prejudice to the underlying principles of the invention, the details and the embodiments may vary, even appreciably, with respect to what has been described by way of example only, without departing from the scope of the invention as defined by the annexed claims.

The invention claimed is:

1. A method of precoding signals transmitted on a downlink from a base station to a plurality of user terminals in a multi-user multiple input-multiple output (MU-MIMO) wireless communication system using a set of multiple subcarriers arranged in plural subsets of said set of multiple subcarriers, comprising:
   selecting a first subset of said plurality of user terminals that are active;
   performing a multi-stage selection of the plurality of user terminals in the first subset, wherein user terminals that are selected remain in the first subset of said plurality of user terminals, and user terminals that are not selected are excluded from the first subset of said plurality of user terminals and are included in a second subset of user terminals for non-MU-MIMO scheduling;
   detecting, with at least one user terminal of said first subset of said plurality of user terminals, channel quality indicators for the subsets of said set of multiple subcarriers, by associating with each channel quality indicator of the detected channel quality indicators a subset of said set of multiple subcarriers for which the channel quality indicator has been detected;
   creating user/subset pairs for the first subset of said plurality of user terminals having the associated channel quality indicators;
   wherein the multi-stage selection includes:
      a first selection as a function of channel quality indicators associated with the user/subset pairs;
      a second selection as a function of one of (i) speed of motion of user terminals in the first subset of said plurality of user terminals, (ii) bit rate of user terminals in the first subset of said plurality of user terminals, (iii) direction of arrival of user terminals in the first subset of said plurality of user terminals, and (iv) angular spread of user terminals in the first subset of said plurality of user terminals; and
      a third selection that is based on a function that is different from that of the first selection and the second selection;
   acquiring channel state information on a connection channel between said base station and only user terminals corresponding to surviving user/subset pairs that remain within the first subset of said plurality of user terminals after the multi-stage selection; and
   performing MU-MIMO scheduling and precoding only on the surviving user/subset pairs.

2. The method of claim 1, wherein said acquiring channel state information comprises signaling, in a downlink from said base station, the user/subset pairs corresponding to the user terminals within the first subset of said plurality of user terminals.

3. The method of claim 1, wherein said channel quality indicators include explicit SINR estimates acquired for the user terminals of the first subset of said plurality of user terminals.

4. The method of claim 1, wherein said detecting channel quality indicators is in the form of a best-M channel quality indicator signaling provided by the user terminals and said acquiring channel state information comprises:

signaling, in the downlink from said base station, at least one user terminal of the first subset of said plurality of user terminals; and receiving, from said signaled at least one user terminal, channel state information corresponding to M best resource subsets or a subset thereof.

5. The method of claim 1, wherein said subsets of said set of multiple subcarriers comprise a resource block or resource blocks, and wherein said user/subset pairs are created as user/resource block pairs having associated channel quality indicators.

6. The method of claim 1, wherein said first selection as a function of the channel quality indicators comprises selecting the user/subset pairs having an associated channel quality indicator above a given threshold.

7. The method of claim 1, wherein said first selection as a function of the channel quality indicators comprises discarding user/subset pairs for which no channel quality indicator is available.

8. The method of claim 1, wherein the second selection as the function of the speed of motion of user terminals in the first subset of said plurality of user terminals includes excluding MU-MIMO user terminals having an estimated speed above a pre-determined speed threshold from the first subset of said plurality of user terminals.

9. The method of claim 1, wherein the second selection as the function of the bit rate of user terminals in the first subset of said plurality of user terminals includes excluding MU-MIMO user terminals requesting a maximum per-user bit rate available in the system from the first subset of said plurality of user terminals.

10. The method of claim 1, wherein the second selection as the function of the angular spread of user terminals in the first subset of said plurality of user terminals includes excluding user terminals within a given angular spread from the first subset of said plurality of user terminals.

11. The method of claim 1, wherein acquiring said channel state information includes acquiring full channel state information on the user/subset pairs corresponding to the user terminals within the first subset of said plurality of user terminals, the full channel state information being more detailed than the channel quality indicators of the user/subset pairs corresponding to the user terminals within the first subset of said plurality of user terminals.

12. The method of claim 1, wherein the first selection is performed on a set of user/subset pairs remaining in the first subset of said plurality of user terminals after the second selection and the third selection.

13. The method of claim 1, wherein the multi-stage selection includes a fourth selection that is based on a function that is different from that of the first selection, the second selection, and the third selection.

14. A system, comprising:

a plurality of user terminals; and a base station configured to perform the method of claim 1.

15. A wireless communication network, comprising:

the system of claim 14.

16. A non-transitory computer-readable medium storing instructions, which, when executed, cause at least one computer to perform the method of claim 1.

* * * * *